United States Patent
Bunyard et al.

(10) Patent No.: US 9,422,387 B2
(45) Date of Patent: Aug. 23, 2016

(54) DUAL RESPONSIVE BLOCK COPOLYMER COMPOSITIONS

(71) Applicant: Kimberly-Clark Worldwide, Inc., Neenah, WI (US)

(72) Inventors: William Clayton Bunyard, DePere, WI (US); Timothy E Long, Blacksburg, VA (US); Adam E. Smith, Christiansburg, VA (US); Shijing Cheng, Saint Paul, MN (US); Sean T. Hemp, Blacksburg, VA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 25 days.

(21) Appl. No.: 13/851,186

(22) Filed: Mar. 27, 2013

(65) Prior Publication Data

US 2013/0261266 A1    Oct. 3, 2013

Related U.S. Application Data

(60) Provisional application No. 61/618,094, filed on Mar. 30, 2012.

(51) Int. Cl.
*C08F 299/00* (2006.01)
*C08F 293/00* (2006.01)

(52) U.S. Cl.
CPC ........... *C08F 299/00* (2013.01); *C08F 293/005* (2013.01); *C08F 2438/03* (2013.01)

(58) Field of Classification Search
CPC ............... C08F 293/00; C08F 293/005; C08F 297/026; C08F 299/00; C08F 2438/03
USPC .......... 525/242, 292, 294, 298, 299, 303, 312
See application file for complete search history.

(56) References Cited

U.S. PATENT DOCUMENTS

| | | | |
|---|---|---|---|
| 5,885,432 A | 3/1999 | Hooper et al. | |
| 6,201,072 B1 | 3/2001 | Rathi et al. | |
| 6,486,213 B1 | 11/2002 | Chen et al. | |
| 6,660,247 B1 | 12/2003 | Gutowska et al. | |
| 6,828,014 B2 | 12/2004 | Branham et al. | |
| 6,897,168 B2 | 5/2005 | Branham et al. | |
| 7,008,628 B2 | 3/2006 | Ron et al. | |
| 7,425,322 B2 | 9/2008 | Cohn et al. | |
| 7,572,844 B2 | 8/2009 | Sato et al. | |
| 7,737,237 B2 | 6/2010 | Destarac | |
| 7,820,753 B2 | 10/2010 | Lewis et al. | |
| 7,884,056 B2 | 2/2011 | Bendejacq et al. | |
| 8,088,252 B2 | 1/2012 | Farwaha et al. | |
| 2004/0030034 A1 | 2/2004 | Chang et al. | |
| 2004/0055704 A1 | 3/2004 | Bunyard et al. | |
| 2004/0110891 A1 | 6/2004 | Guo et al. | |
| 2007/0258866 A1 | 11/2007 | Nishimi et al. | |
| 2009/0111928 A1 | 4/2009 | Mikos et al. | |
| 2009/0117075 A1 | 5/2009 | Huang et al. | |
| 2009/0220614 A1 | 9/2009 | Qin et al. | |
| 2010/0129830 A1 | 5/2010 | Deshayes et al. | |
| 2010/0215749 A1* | 8/2010 | Stayton et al. | 424/487 |
| 2011/0130321 A1* | 6/2011 | Karagianni et al. | 510/513 |

FOREIGN PATENT DOCUMENTS

| | | | | |
|---|---|---|---|---|
| WO | WO 2010010124 A1 * | 1/2010 | | A61Q 19/10 |
| WO | WO 2010059939 A1 * | 5/2010 | | |

* cited by examiner

*Primary Examiner* — Irina S Zemel
*Assistant Examiner* — Jeffrey Lenihan
(74) *Attorney, Agent, or Firm* — Kimberly-Clark Worldwide, Inc.

(57) ABSTRACT

A composition includes a responsive block copolymer, the responsive block copolymer including at least one block A that is a triggerable copolymer, the triggerable copolymer including at least one lower critical solution temperature monomer and at least one charged monomer, wherein the triggerable copolymer block A is a dual trigger block configured to trigger on temperature and ionic strength, and wherein the responsive block copolymer micellizes or gels at a temperature between 28° C. and 37° C. and a salt concentration of about 0.9 wt %.

17 Claims, 11 Drawing Sheets

US 9,422,387 B2

DUAL RESPONSIVE BLOCK COPOLYMER COMPOSITIONS

PRIORITY

This non-provisional application claims priority of Provisional Application No. 61/618,094, filed on Mar. 30, 2012. The entirety of Application No. 61/618,094 is incorporated herein by reference.

BACKGROUND

The present disclosure relates to compositions that have the ability to have an efficient response to the presence of body fluids at various physiological temperatures.

Stimuli-responsive polymers have a crucial role in the development of materials for biological applications. Temperature-responsive polymers that exhibit a lower critical solution temperature (LOST) in aqueous solutions have shown promise in the fields of drug and gene delivery, compound extraction, and surface modification. Of the known thermo-responsive polymers, poly(N-isopropylacrylamide) (PNIPAM), with its LOST value of 32° C. in water, has received the most attention and application. However, PNIPAM has several disadvantages including irreversible phase transitions and influence from the end-groups of lower molecular weight polymer species affecting the thermal behavior. Additionally, residual N-isopropylacrylamide monomer in PNIPAM can be problematic for high-volume, relatively lower cost consumer products. In looking for alternatives to PNIPAM, some focus has shifted onto biocompatible, thermo-responsive polymers that feature short sidechains of ethylene glycol. These polymers not only provide enhanced thermal behavior but they also allow for applications beyond drug and gene delivery and into consumer products.

It is thus desirable to provide thermo-responsive materials that account for ionic strength and temperature and can be used in applications such as personal care products.

SUMMARY

The present disclosure relates to a composition including a responsive block copolymer, the responsive block copolymer including at least one block A that is a triggerable copolymer, the triggerable copolymer including at least one lower critical solution temperature monomer and at least one charged monomer, wherein the triggerable copolymer block A is a dual trigger block configured to trigger on temperature and ionic strength, and wherein the responsive block copolymer micellizes or gels at a temperature between 28° C. and 37° C. and a salt concentration of about 0.9 wt %.

The present disclosure also relates to a composition including a responsive block copolymer, the responsive block copolymer including a block A that is a triggerable copolymer, the triggerable copolymer including at least one lower critical solution temperature monomer and at least one charged monomer, wherein the triggerable copolymer block A is a dual-trigger block configured to trigger on temperature and ionic strength, and wherein the A block becomes insoluble at a temperature between 28° C. and 37° C. and a salt concentration of about 0.9 wt %.

The present disclosure also relates to a composition including a responsive triblock copolymer, the responsive triblock copolymer including at least two blocks A that are each a triggerable copolymer, each triggerable copolymer including at least one lower critical solution temperature monomer and at least one charged monomer, wherein each triggerable copolymer block A is a dual trigger block configured to trigger on temperature and ionic strength; and a non-triggerable copolymer block B, wherein the responsive block copolymer is in the form A-B-A, and wherein the responsive block copolymer gels at a temperature between 30° C. and 37° C. at approximately 0.9 wt % sodium chloride.

BRIEF DESCRIPTION OF THE DRAWINGS

The foregoing and other features and aspects of the present disclosure and the manner of attaining them will become more apparent, and the disclosure itself will be better understood by reference to the following description, appended claims and accompanying drawings, where:

Figure 1:
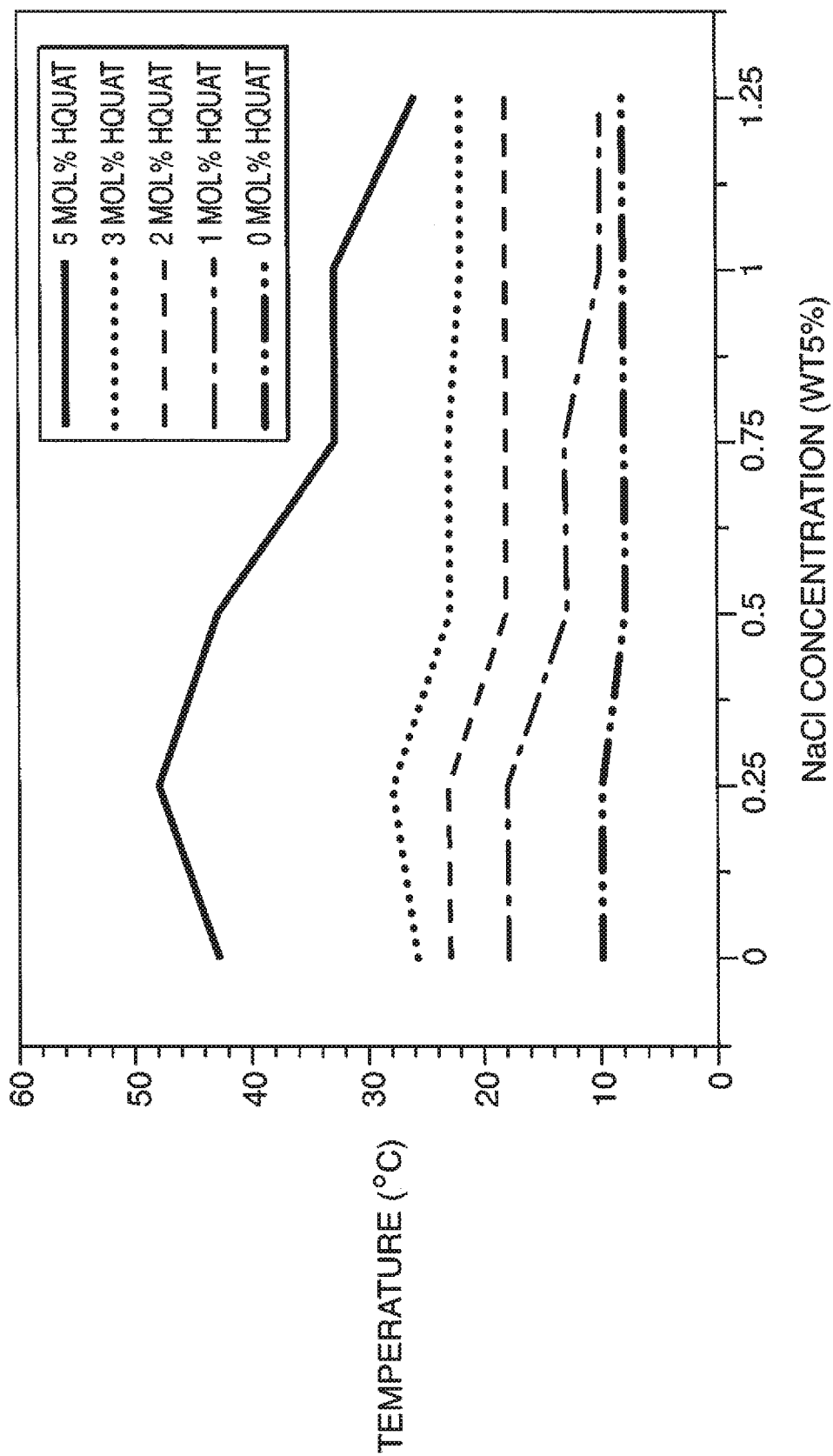
FIG. 1 illustrates the cloud point behavior of poly(DEGA$_x$-co-HQUAT$_y$) series at various concentrations of NaCl.

Repeat use of reference characters in the present specification and drawings is intended to represent the same or analogous features or elements of the present disclosure. The drawings are representational and are not necessarily drawn to scale. Certain proportions thereof might be exaggerated, while others might be minimized.

DETAILED DESCRIPTION

While the specification concludes with the claims particularly pointing out and distinctly claiming the invention, it is believed that the present disclosure will be better understood from the following description.

All percentages, parts and ratios are based upon the total weight of the compositions of the present disclosure, unless otherwise specified. All such weights as they pertain to listed ingredients are based on the active level and, therefore; do not include solvents or by-products that might be included in commercially available materials, unless otherwise specified. The term "weight percent" can be denoted as "wt. %" herein. Except where specific examples of actual measured values are presented, numerical values referred to herein should be considered to be qualified by the word "about."

As used herein, "comprising" means that other steps and other ingredients that do not affect the end result can be added. This term encompasses the terms "consisting of" and "consisting essentially of." The compositions and methods/processes of the present disclosure can comprise, consist of, and consist essentially of the essential elements and limitations of the disclosure described herein, as well as any of the additional or optional ingredients, components, steps, or limitations described herein.

As used herein, "body fluids" refers to fluids that are excreted or secreted from the body including, but not limited to, bile, diarrhea, urine, blood, mucus, vaginal fluids, nasal fluids, sweat, and the like.

In order to enable higher order benefits in personal care products and develop a variety of products in the marketplace, the present disclosure provides compositions that have the ability to have a "smart" response in the presence of body fluids at their respective physiological temperatures and ionic strength (or salt concentrations). Smart responses include, but are not limited to, changes in solubility, wettability, lubricity, permeability, barrier properties and tensile strength. These responses are then tailored to be triggered to change at an appropriate combination of temperature and ionic strength. A combination of environmental triggers such as temperature and ionic strength is preferable and provides more precise control of the "smart" response desired of the product in the presence of body fluids. For instance, a product can have one response to body fluids at physiological temperature or temperatures of when in contact with the body but have a different response when those body fluids are at room temperature. While typical "smart" materials explored in the past often made use of temperature, pH, or ionic strength-based triggers alone, the present disclosure accounts for the combination of such triggers. Additionally, many of these materials were tailored for drug delivery or other high end applications and have not been developed for personal care applications that are less tolerant to high cost materials and can require a very different combination of material properties.

Compositions of the present disclosure include responsive polymers that can be applied in personal care products. Specifically, the responsive polymers are block copolymer structures including at least one responsive or triggerable polymer block A and at least one non-triggerable polymer block B. The overall design of the block copolymer will be tailored to the specific application desired. Examples of block copolymer architectures (or arrangement of the blocks in the overall block copolymer structure) could be, but are not limited to, A-B diblock structure, A-B-A, B-A-B, and the like triblock or other multiblock structures. Additionally, in a multi-block structure such as $A_1$-B-$A_2$, $A_1$ can be configured to trigger at one set of conditions while $A_2$ is designed to trigger at a different set of conditions.

The polymer block A provides the dual combination of ionic strength and temperature-responsive functionality to the responsive polymers. Monomers used in the formation of polymer block A include at least one "LOST monomer" and one monomer with a charged functional group. The "LOST monomer" is defined as one whose homopolymer demonstrates a lower-critical solution temperature (LOST) solubility behavior in aqueous solution. Specific examples of such LOST monomers include, oligoethylene oxide-based (meth)acrylates such as di(ethylene glycol) methyl ether acrylate, di(ethylene glycol) ethyl ether acrylate, di(ethylene glycol) ethyl ether methacrylate, di(ethylene glycol) methyl ether methacrylate, tri(ethylene glycol) methyl ether acrylate, and tri(ethylene glycol) methyl ether methacrylate. Examples of the monomer with the charged functional group could include, but are not limited to, acrylate, methacrylate, or acrylamide monomers with either cationic, zwitterionic, or anionic-functional groups such as [2-(acryloyloxy)ethyl]trimethylammonium chloride (HQUAT) or [2-(methacryloyloxy)ethyl]trimethylammonium chloride, 2-Acrylamido-2-methylpropane sodium sulfonate, dimethylaminoethyl acrylate, or dimethylaminoethyl methacrylate (DMA). The relative amounts of the LOST monomer and the charged monomer in the A block composition is determined by the particular combination of ionic strength and temperature desired for the solubility transition.

If the composition is to be used in conjunction with a heated body, in one aspect the triggerable block can be configured to become insoluble at least a few degrees below the actual temperature of the heated body so that the composition can "set" and be stable by the time it equilibrates to the target temperature/salt combination. As an example of the usefulness of dual triggers, a triblock composition can be configured to gel at 28° C. in presence of salt when the temperature of the heated body is 31° C. A diblock composition can be configured to micellize at 34° C. in the presence of salt when the temperature of the heated body is 37° C. Using a dual trigger provides more control of the trigger point. For instance, if a composition is to be spread or distributed on a heated body before gelling or precipitating, having a gel point/precipitation point closer to the temperature of the heated body helps give the composition time to achieve that goal. If the insolubility transition is too low, the composition would gel before being able to do that.

In various aspects of the present disclosure, a triggerable block A in the diblock or triblock copolymer composition is configured to become insoluble in the combination of the temperature ranging between 28° C. and 37° C., more preferably 30° C. to 35° C., and at a salt concentration of about 0.9 wt %. Both conditions need to be met for the block A to become insoluble. The triggerable A block is soluble outside of these combinations. For example, if the temperature is in the targeted range (e.g., 30° C. to 37° C.) but the salt concentration is much less than 0.9 wt % NaCl, the block A will be soluble. In another example, if the salt concentration is at 0.9 wt % NaCl but the temperature is below the targeted range (e.g., 30° C. to 37° C.), the block A will be soluble. In a final example, if the temperature is below the targeted range (e.g., 30° C. to 37° C.), and the salt concentration is much less than 0.9 wt % NaCl, the block A will be soluble. In addition, if conditions are appropriate and block A becomes insoluble, dropping the temperature outside the range or the salt concentration below its target will cause the block A to reverse and become soluble.

The cloud point temperature (CPT—defined below) of a triggerable block will increase once incorporated into a diblock or triblock composition containing a second hydrophilic block. Thus, the CPT of the triggerable block precursor by itself may need to be a few degrees lower to compensate and enable the final polymer performance. Conversely, if the triggerable block is attached to a hydrophobic block within a diblock or triblock copolymer, the CPT of the precursor block may need to be higher to compensate for the final diblock or triblock copolymer composition.

The composition of the polymer B block is dependent on the particular application of interest. For instance, if the desire is to promote block A insolubility to form responsive block copolymer micelles or surface active polymers to adsorb onto hydrophobic surfaces in aqueous solution, the composition of polymer B can be water soluble. If a responsive hydrogel-forming block copolymer structure is desired, the composition of B could potentially be either a hydrophilic polymer or hydrophobic polymer, depending on the architecture of the block copolymer. If adsorption of responsive block copolymers on a surface is desired, the B would be designed to have affinity to the particular surface of interest. Example monomers that could be used in block B include, but are not limited to, hydrophobic monomers such as butyl acrylate, methyl acrylate, ethyl acrylate, 2-ethylhexyl acrylate, methyl methacrylate, ethyl methacrylate, methyl methacrylate, or hydrophilic monomers such as 2-hydroxypropyl acrylate, hydroxyethyl methacrylate, hydroxyethyl acrylate, poly(ethylene glycol) methyl ether acrylate (PEGA).

In addition to the monomer composition of the A and B blocks, the molecular weights of these blocks are important as well for achieving the required properties for the application of interest. Molecular weights of block A could range from approximately 5,000 g/mol to approximately 100,000 g/mol and molecular weights of block B could range from 5,000 g/mol to 100,000 g/mol. The ratios of molecular weights of blocks A and B are important as well. The ability to change block copolymer solution and solid state properties as a function of block molecular weight and relative block lengths or ratios is well known in the art.

The responsive block copolymers can be synthesized by any of the known methods for forming block copolymers, with controlled free-radical polymerization approaches being the most useful. Methods of controlled free-radical polymerization include atom-transfer radical polymerization (ATRP), stable free-radical polymerization (SFRP), and reversible addition-fragmentation chain transfer polymerization (RAFT). The block copolymers are synthesized sequentially. For example, an A-B block copolymer polymerized via RAFT will call for the synthesis of polymer A, which becomes the precursor for the block copolymer. For RAFT, this can also be specifically called a macro-CTA (chain transfer agent) that does not become a block copolymer until the complete synthesis of polymer A and a subsequent addition of monomer(s) is added to generate the B block. The exact sequence of construction of the block copolymer is dependent upon the type of RAFT chain-transfer agent (CTA) used. The A block will be dual-triggered but not the B block.

For example, A-B-A block copolymers that have a dual responsive triggerable A block, where the dual response is to salt and temperature and the B block is hydrophilic can be used to form a responsive, reversible gel-forming material. Utilizing RAFT polymerization techniques and a di-functional chain transfer agent (CTA), the dual-responsive triggerable A block macro-CTA can be synthesized. An example polymer composition could be, but is not limited to a copolymer of (diethylene glycol) ethyl ether acrylate (DEGA), and the cationic monomer [2-(acryloyloxy)ethyl]trimethylammonium chloride (HQUAT). Synthesis is exemplified accordingly:

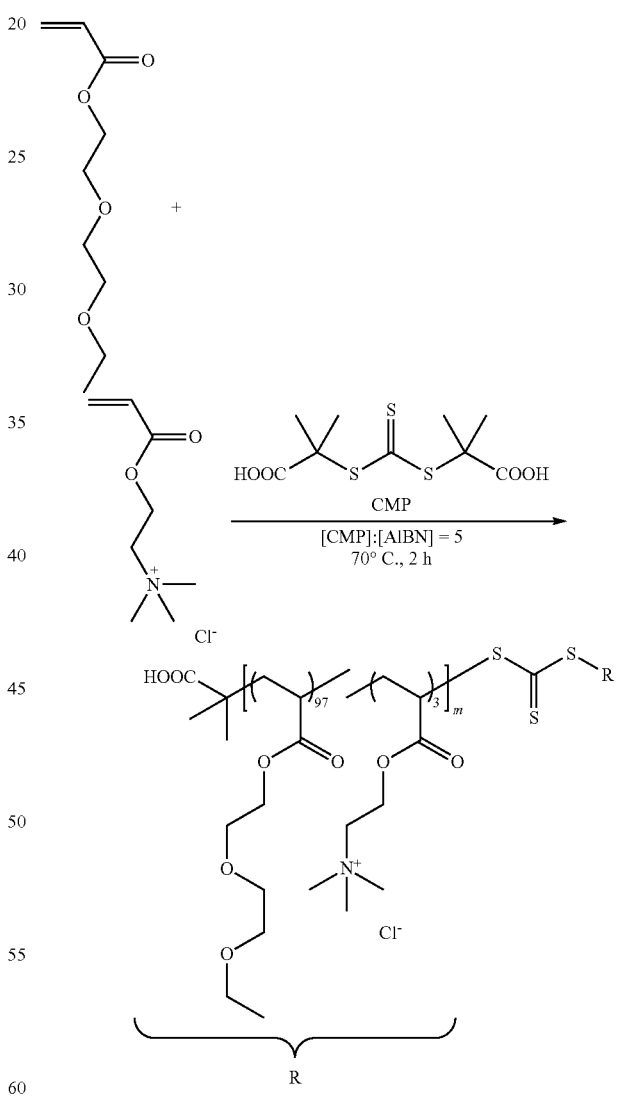

RAFT copolymerization of DEGA and HQUAT outer blocks.

RAFT chain extension of poly(DEGA-co-HQUAT) with poly(ethylene glycol) methyl ether acrylate (PEGA) will form the final A-B-A block copolymer, where the B block is hydrophilic. Synthesis is exemplified accordingly:

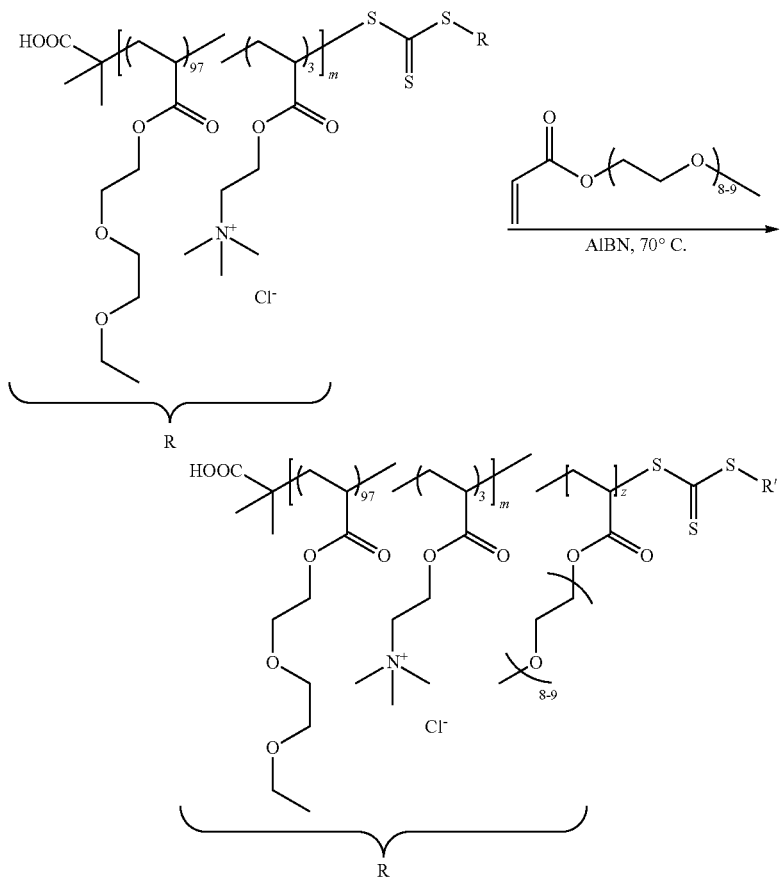

Block copolymers of the present disclosure provide advantages over various previous polymers because they provide more feasibility to personal care applications. By having at least one LCST monomer and a charged functional group monomer, the affinity for particular substrates such as cellulose might increase for personal care applicability. The A block copolymer will include at least one charged functional group monomer that is able to be triggered.

To illustrate the responsive properties of a triggerable block copolymer of the present disclosure to a combination of temperature and ionic strength (or salt concentration), and additionally pH, phase diagrams as a function of these two or three variables were constructed. Using light scattering, visual methods, or rheology methods, critical micellization temperatures, cloud point temperatures, and gel point temperatures were determined respectively by changing the temperature of a polymer solution at a defined salt concentration (or ionic strength) and observing the point at which the polymer solution transitions from a soluble to insoluble state." For light scattering methods, the cloud point can be defined as the point at which a large change in hydrodynamic radius is observed. For example, a soluble polymer below the cloud point can have a hydrodynamic radius around 10 nm and an insoluble polymer would have a hydrodynamic radius of about 1000 nm. For visual methods, the "cloud point" is defined as the point at which the polymer solution turned from optically clear to cloudy appearance. For a "gel point", that would be the point at which the G' and G" overlap in the solution rheology.

Personal care products of the present disclosure include but are not limited to, infant care products, including diapers, baby wipes, training pants and other disposable garments; feminine care products, including sanitary napkins, wipes, menstrual pads, panty liners, panty shields, tampons and tampon applicators; adult care products, including wipes, pads, incontinency products and urinary shields; service, industrial and household products, consisting of wipes, covers, filters, paper towels, bath tissue and facial tissue; and formulations to be applied to skin or mucosal membranes.

EXAMPLES

The following examples further describe and demonstrate aspects within the scope of the present disclosure. The examples are given solely for the purpose of illustration and are not to be construed as limitations of the present disclosure, as many variations thereof are possible without departing from the spirit and scope of the disclosure.

Example 1

Methods

Figure 9:
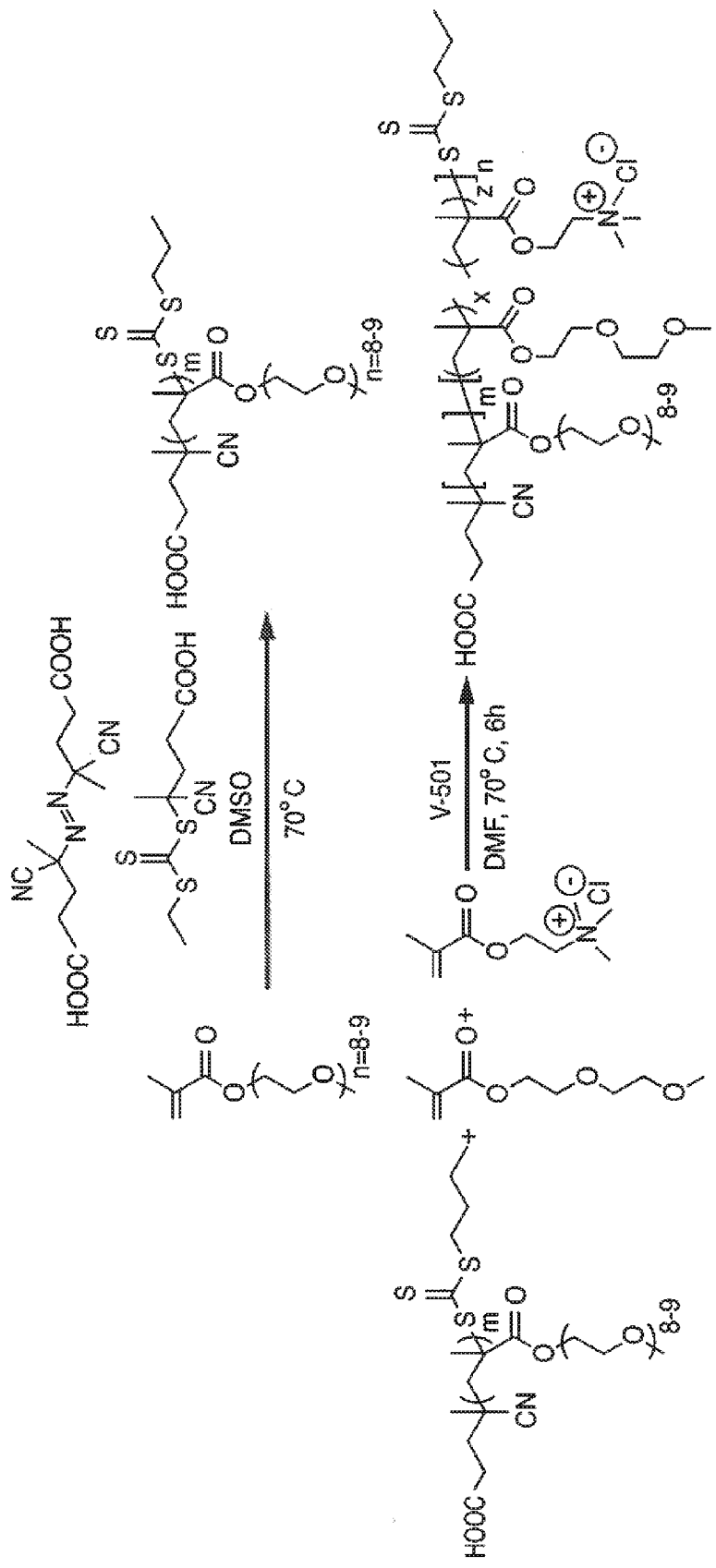
FIG. 9 illustrates scheme 1: RAFT polymerization of poly (OEG) macro-CTA and subsequent chain extension with DEG and TMA to synthesize doubly-responsive diblock copolymers.
Figure 10:
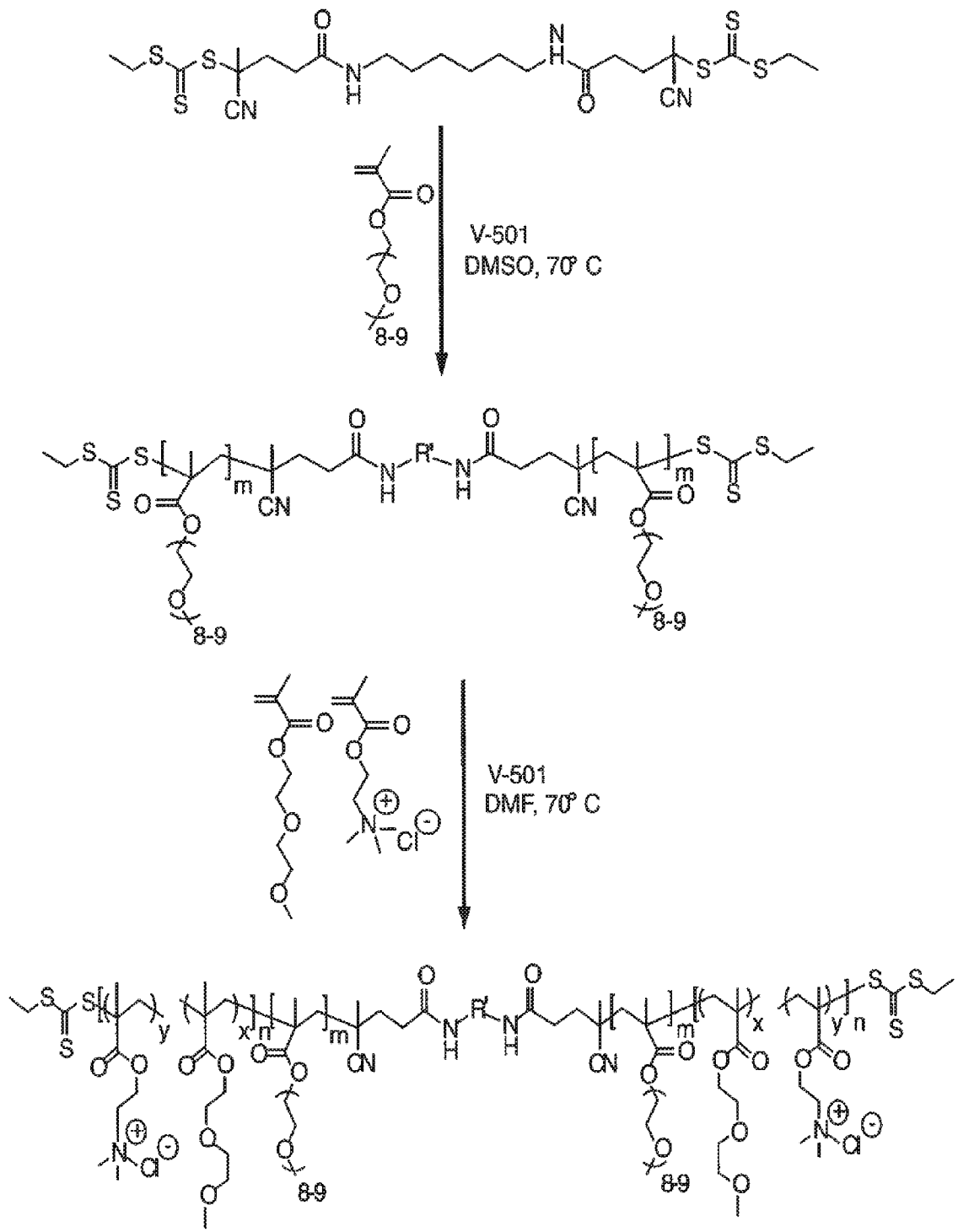
FIG. 10 illustrates scheme 2: RAFT polymerization to synthesize temperature- and salt-responsive triblock copolymers.

RAFT polymerization as illustrated in FIGS. 9 and 10 was used to synthesize the block copolymer precursors and block copolymers. The polymer compositions were characterized by $^1$H NMR spectroscopy and size exclusion chromatography (SEC). Dynamic light scattering (DLS) and solution rheology were used to characterize the responsive or triggerable properties of the materials. Representative descriptions of these methods can be found below.

A representative RAFT polymerization procedure is given below:

Materials. Oligo(ethylene glycol) methyl ether methacrylate (OEG) (485 g/mol) and diethylene glycol methyl ether methacrylate (DEG) (95%) (Sigma-Aldrich, Milwaukee, Wis.) were de-inhibited via an alumina column prior to polymerization. [2-(methacryloyloxy) ethyl]trimethylammonium chloride (80 wt % in water) (Sigma-Aldrich) was used as received. 4,4'-Azobis(4-cyanopentanoic acid) (V-501) (>98%) (Sigma-Aldrich) was recrystallized from methanol. CEP[1] (4-Cyano-4-(ethylsulfanylthiocarbonylsulfanyl)pentanoic acid) was synthesized according to the procedure in Convertine, A. J.; Benoit, D. S. W.; Duvall, C. L.; Hoffman, A. S.; Stayton, P. S., *Journal of Controlled Release* 2009, 133 (3), 221-229. dCEP[2] (1,6-bis(4-cyano-4-(ethylsulfanyl-thiocarbonylsulfanyl)pentanoic acid)-hexane diamide) was synthesized according to the procedure in Allen, M. H.; Hemp, S. T.; Zhang, M.; Zhang, M.; Smith, A. E.; Moore, R. B.; Long, T. E., *Polymer Chemistry* 2013, ASAP. All other solvents and reagents were purchased from Sigma-Aldrich.

Poly(OEG) Difunctional Macro-CTA. OEG (0.995 g, 2.05 mmol), dCEP (8.34 mg, 0.0137 mmol), V-501 (1.54 mg, 0.00549 mmol), and DMSO (8.247 mL) were added to a 25-mL, round-bottomed flask with a magnetic stir bar. The resulting solution was sparged with Ar for 30 min and then heated at 70° C. for 220 min. The polymer solution was dialyzed against water (MWCO=3,500 g/mol) and lyophilized to obtain a yellow oil (Aqueous SEC: $M_n$=74.6 kg/mol, PDI=1.01).

Synthesis of Salt- and Temperature-Responsive Triblock Copolymers. A representative procedure to synthesize poly(DEG$_x$TMA$_y$-b-OEG-b-DEG$_x$TMA$_y$) triblock copolymers follows with an example to feed 3 mol % TMA into the outer block. DEG (2.89 mL, 15.7 mmol), TMA (114 μL, 0.439 mmol), poly (OEG) macro-CTA (523.9 mg, $M_n$=64.9 kg/mol), and DMF (15.99 mL) were added to a 25-mL, round-bottomed flask with magnetic stir bar. The resulting solution was sparged with Ar for 30 min and subsequently heated at 70° C. for 7 h. The polymer solution was dialyzed against water (MWCO=3,500 g/mol) at 4° C. and lyophilized to obtain a slightly yellow polymer (Aqueous SEC: $M_n$=230 kg/mol, PDI=1.19).

Molecular Weight Determination. Aqueous size exclusion chromatography (SEC) was performed using a ternary mixture of 54/23/23 v/v/v water/methanol/acetic acid with 0.1 M sodium acetate as the eluent. The Aqueous SEC setup consisted of a Waters 1515 isocratic HPLC pump, a Waters 717plus autosampler, two Waters ultrahydrogel linear columns, one Waters ultrahydrogel 250 column, a Wyatt MiniDAWN light scattering (LS) detector, and a Waters 2414 refractive index (RI) detector operating at a flow rate of 0.8 mL/min. Number-average molecular weights ($M_n$) and weight-average molecular weights ($M_w$), and polydispersity indexes (PDI) were determined from the SEC data.

Critical Micellization Temperature (CMT). Dynamic light scattering with a Malvern Zetasizer Nano was used to determine the critical micellization temperature (CMT). Polymer solutions (1 mg/mL in deionized water (HPLC-grade water from Sigma-Aldrich) or 0.9 wt % NaCl in water) were subjected to a temperature step protocol (2° C./step from 4° C. to 50° C.) and the hydrodynamic diameters were measured after a 5 min equilibration at each step. The critical micellization temperature was attributed to the first temperature measured at which the hydrodynamic diameters were greater than >20 nm, indicating aggregation and micellization of the unimers (<10 nm).

Cloud Point Temperature (CPT). Polymer solutions (5 wt %) in deionized water with different concentrations of sodium chloride (0.00-1.25 wt % NaCl in 0.25 wt % increments) were equilibrated for 30 minutes at temperatures ranging from 5° C. to 48° C. in 3 degree increments. For this visual method, the "cloud point temperature" (CPT) is defined as the point at which the polymer solution turned from optically clear to cloudy appearance.

Gel Point Temperature (GPT). Solution rheology using a TA Instruments DHR-2 strain-controlled rheometer with a 2° 40 mm cone and Peltier plate geometry directly probed hydrogel formation and overall gel strengths. Polymer solutions (25 wt % polymer in pure water or 0.9 wt % NaCl in water) were subjected to temperature sweep experiments using 1% oscillatory strains at 1 Hz with a heating rate of 0.5° C./min from 4° C. to 50° C. The gel point temperature (GPT) was determined using the TA Instruments TRIOS package and was defined as the crossover point of the storage and loss moduli.

Example 2

Polymers were synthesized via RAFT polymerization methods using a combination of methyl acrylate (MA), [2-(acryloyloxy)ethyl]trimethylammonium chloride (HQUAT), and 2-methyoxyethyl acrylate (MEA).

Example 3

A homopolymer of (diethylene glycol) ethyl ether acrylate (DEGA) was synthesized via RAFT polymerization methods. Cloud point temperatures (CPTs) were determined for the polymer over a temperature range of 5 to 50° C. and a salt concentration range of 0 to 1.25 wt % NaCl. The cloud point curve is provided in FIG. 1 along with cloud point temperature at 0.9 wt % NaCl in Table 1.

Poly(DEGA$_x$-co-HQUAT$_y$) block copolymer precursors (or macro chain transfer agents, "macro-CTA") were synthesized by RAFT polymerization techniques to provide a difunctional "trigger" block. Cloud points were determined for the polymer by change in hydrodynamic radius over a temperature range of 5 to 50° C. and a salt concentration range of 0 to 1.25 wt % NaCl. The phase diagram illustrating the cloud point temperatures is provided in FIG. 1. The CPT of a triggerable block will increase once incorporated into a diblock or triblock composition containing a second hydrophilic block. Thus, the CPT of the triggerable block precursor by itself may need to be a few degrees lower to compensate and enable the final polymer performance. Conversely, if the triggerable block is attached to a hydrophobic block within a diblock or triblock copolymer, the CPT of the precursor block may need to be higher to compensate for the final diblock or triblock copolymer composition. The cloud point temperatures at 1.0 wt % NaCl are provided in Table 1 as a summary of Poly(DEGA$_x$-co-HQUAT$_y$) compositions. The composition C7 shows no salt dependence on the CPT. Compositions C8-C10 show a CPT at 1.0 wt % at temperatures comparable to room temperature. E1 and E2 show a transition at 1.0 wt % within the desired temperature range but are still soluble at low salt concentrations, particularly 0.5 wt % NaCl and below.

TABLE 1

| Example | DEGA (mol %) | HQUAT (mol %) | $M_n$ (kg/mol) | PDI | CPT (°C.) at 1.0 wt % NaCl |
|---|---|---|---|---|---|
| C7 | 100 | 0 | 19.4 | 1.46 | 9 |
| C8 | 99 | 1 | 21.0 | 1.46 | 13 |
| C9 | 98 | 2 | 18.5 | 1.55 | 20 |
| E1 | 97 | 3 | 18.8 | 1.57 | 23 |
| E2 | 95 | 5 | 23.0 | 1.70 | 33 |

Example 4

Figure 2A:
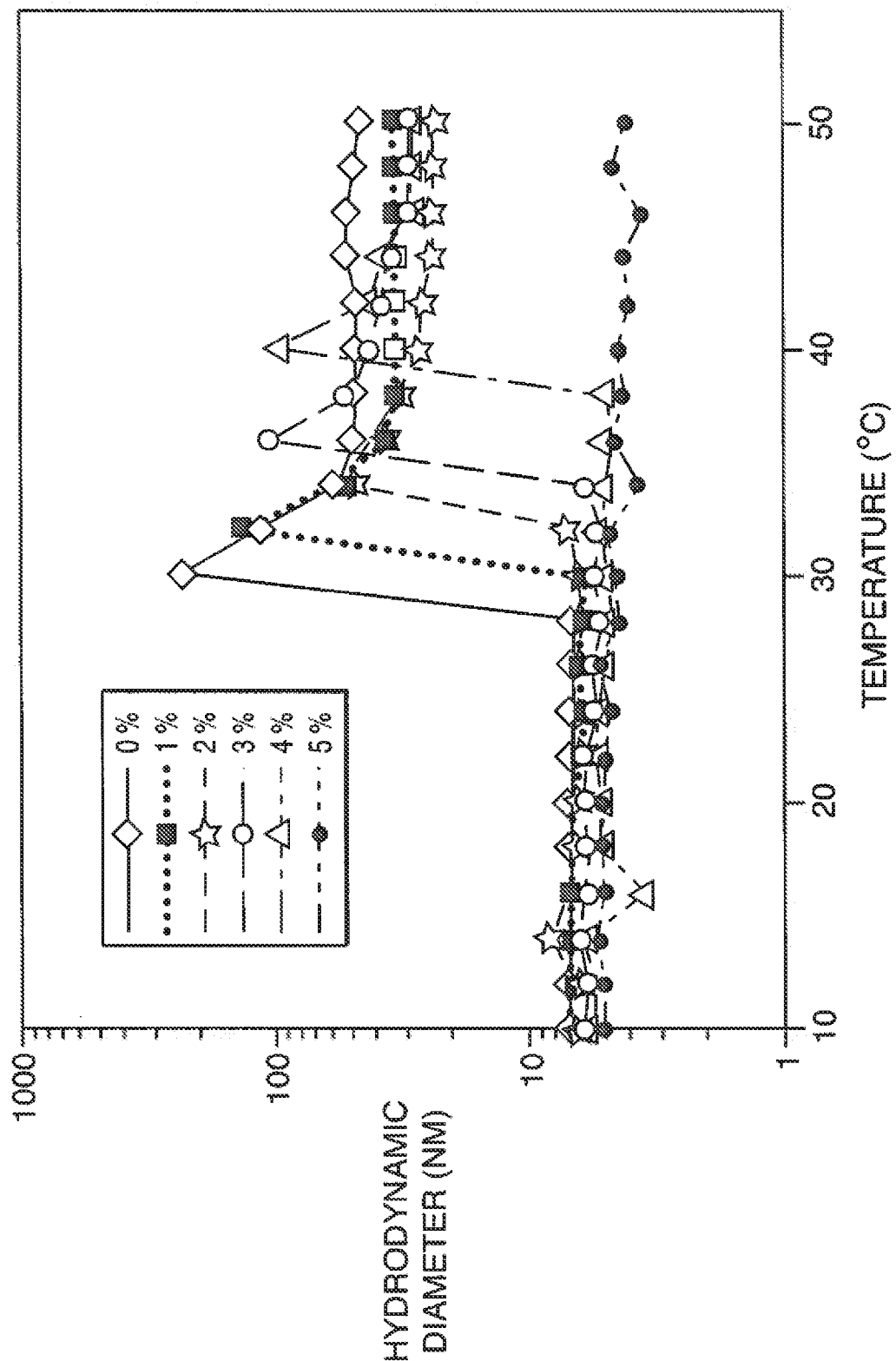
FIG. 2a illustrates the temperature-responsive micellization of the OEG-b-(DEG$_x$TMA$_y$) diblock copolymer series in water (legend corresponds to mol % TMA)
Figure 2B:
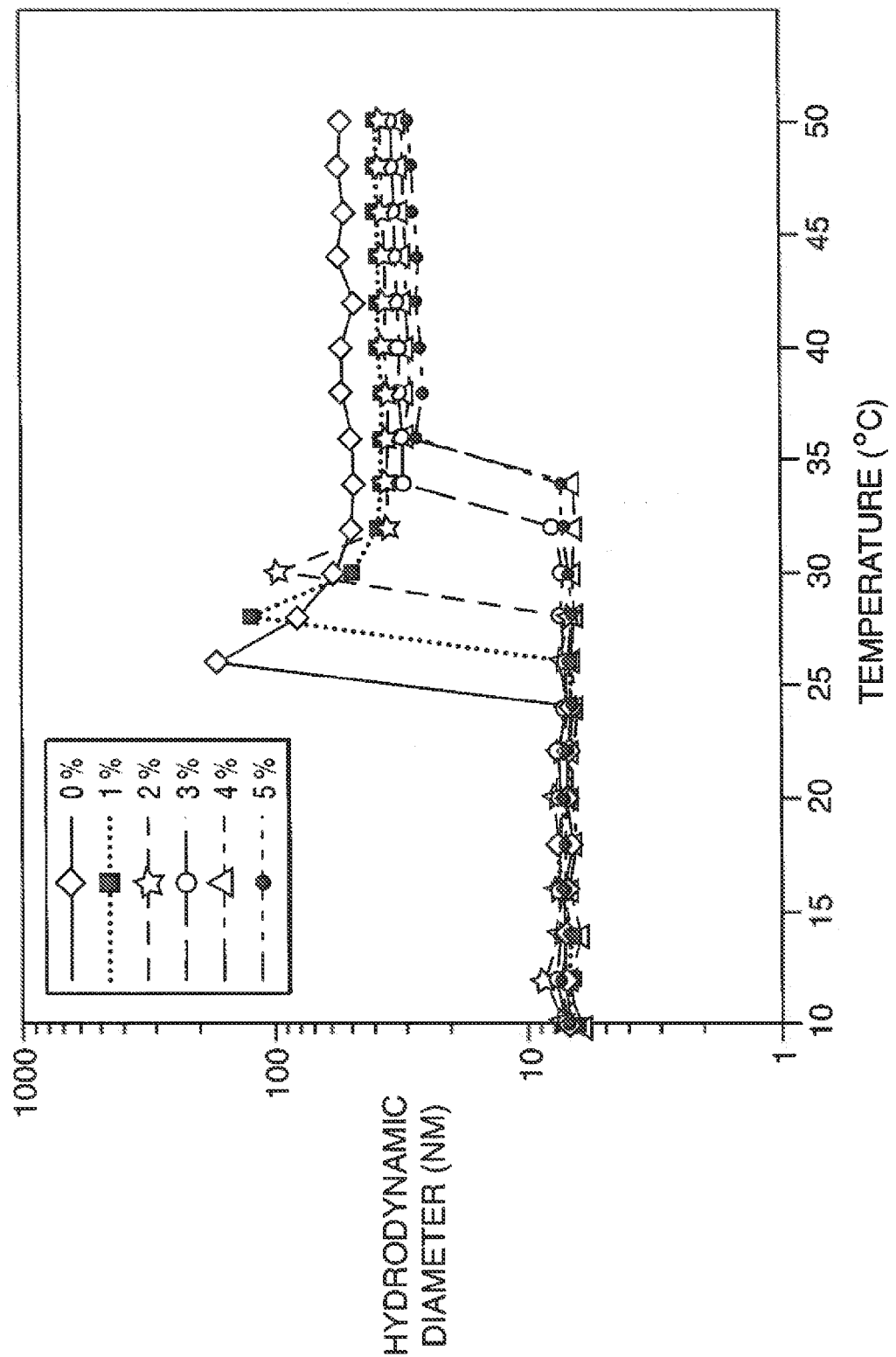
FIG. 2b illustrates the temperature-responsive micellization of the OEG-b-(DEG$_x$TMA$_y$) diblock copolymer series in 0.9 wt % NaCl in water (legend corresponds to mol % TMA)

Diblock copolymers were synthesized from a poly(OEG) macro-CTA (composition C12 in Table 2). The macro-CTA poly(OEG) B block was chain-extended with copolymers of different compositions of the LCST monomer DEG and the cationically charged monomer TMA to create the triggerable A block in a diblock copolymer structure. Compositions C13, C14 have a CMT below the target temperature range in the presence of 0.9 wt % NaCl while compositions E4-E7 have CMT values within the target range. E6 and E7 also show solubility at temperatures at our above body temperature in the absence of NaCl. The temperature response is demonstrated in FIG. 2.

TABLE 2

Characterization of the OEG-b-(DEG$_x$TMA$_y$) A-B diblock copolymer series

| Example | A "Triggerable" Block Composition DEG (mol %) | A "Triggerable" Block Composition TMA (mol %) | B "Soluble" Block Composition OEG (mol %) | $M_n{}^c$ (kg/mol) | PDI | DP$^a$ of A Block | DP$^a$ of B Block | CMT$^b$ (°C.) in water | CMT$^b$ (°C.) in 0.9 wt % NaCl |
|---|---|---|---|---|---|---|---|---|---|
| C12 | n/a | n/a | 100 | 13.6 | 1.04 | 0 | 28 | n/a | n/a |
| C13 | 100 | 0 | 100 | 41.6 | 1.03 | 149 | 28 | 28 | 24 |
| C14 | 99 | 1 | 100 | 39.4 | 1.03 | 137 | 28 | 30 | 26 |
| E4 | 98 | 2 | 100 | 44.0 | 1.03 | 161 | 28 | 32 | 28 |
| E5 | 97 | 3 | 100 | 41.2 | 1.02 | 147 | 28 | 34 | 32 |
| E6 | 96 | 4 | 100 | 40.3 | 1.02 | 141 | 28 | 38 | 34 |
| E7 | 95 | 5 | 100 | 41.7 | 1.03 | 149 | 28 | >50 | 34 |

$^a$DP = estimated average degree of polymerization;
$^b$CMT = Critical micellization temperature;
$^c$M$_n$ = number average molecular weight

Example 5

Figure 3:
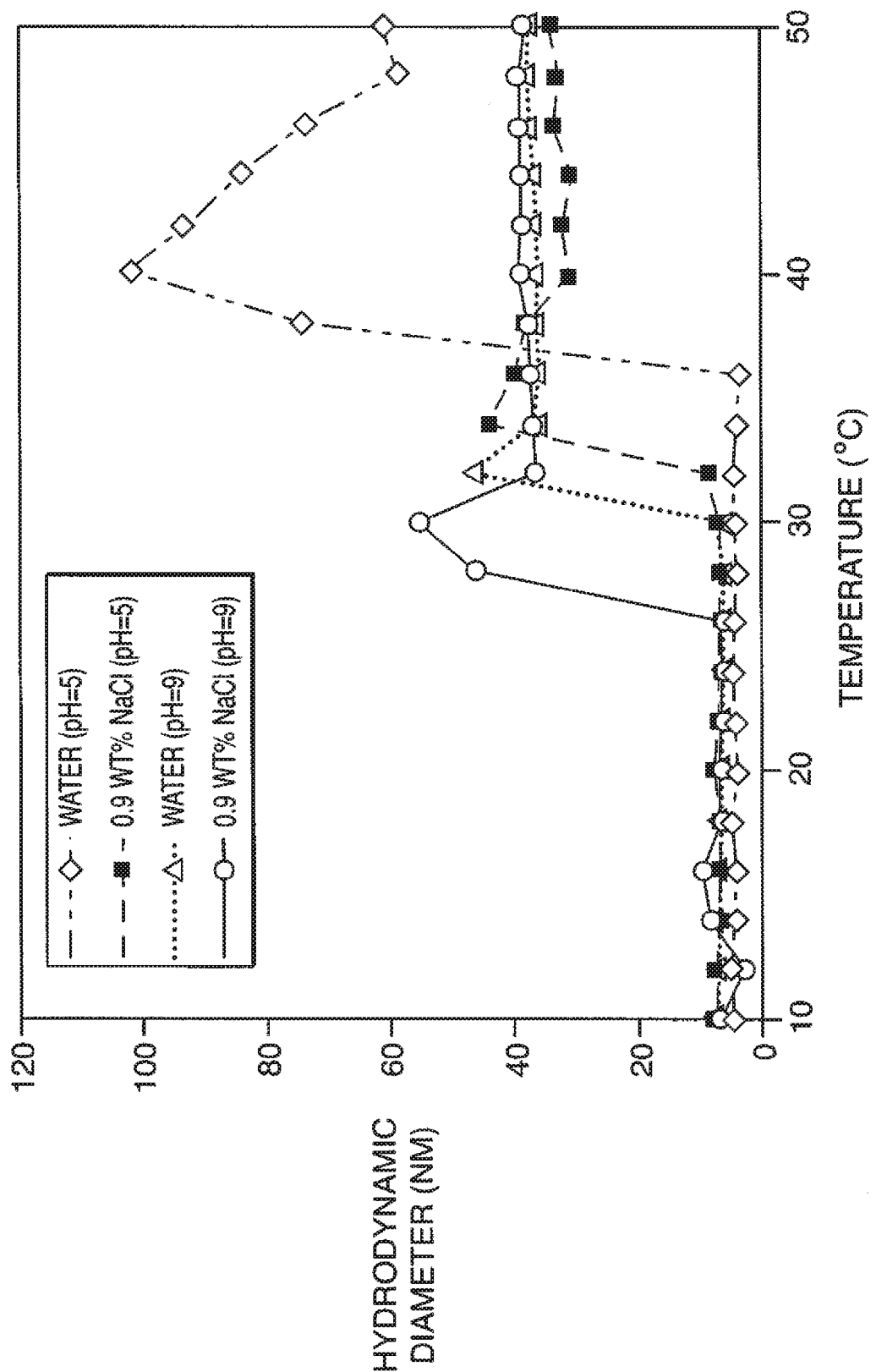
FIG. 3 illustrates the salt-, temperature-, and pH-response of poly(OEG-b-DEG$_{90}$DMA$_5$MMA$_5$) 13.5 k-b-23.3 k showing a triply-responsive block copolymers with respect to salt, pH, and temperature.
Figure 4:
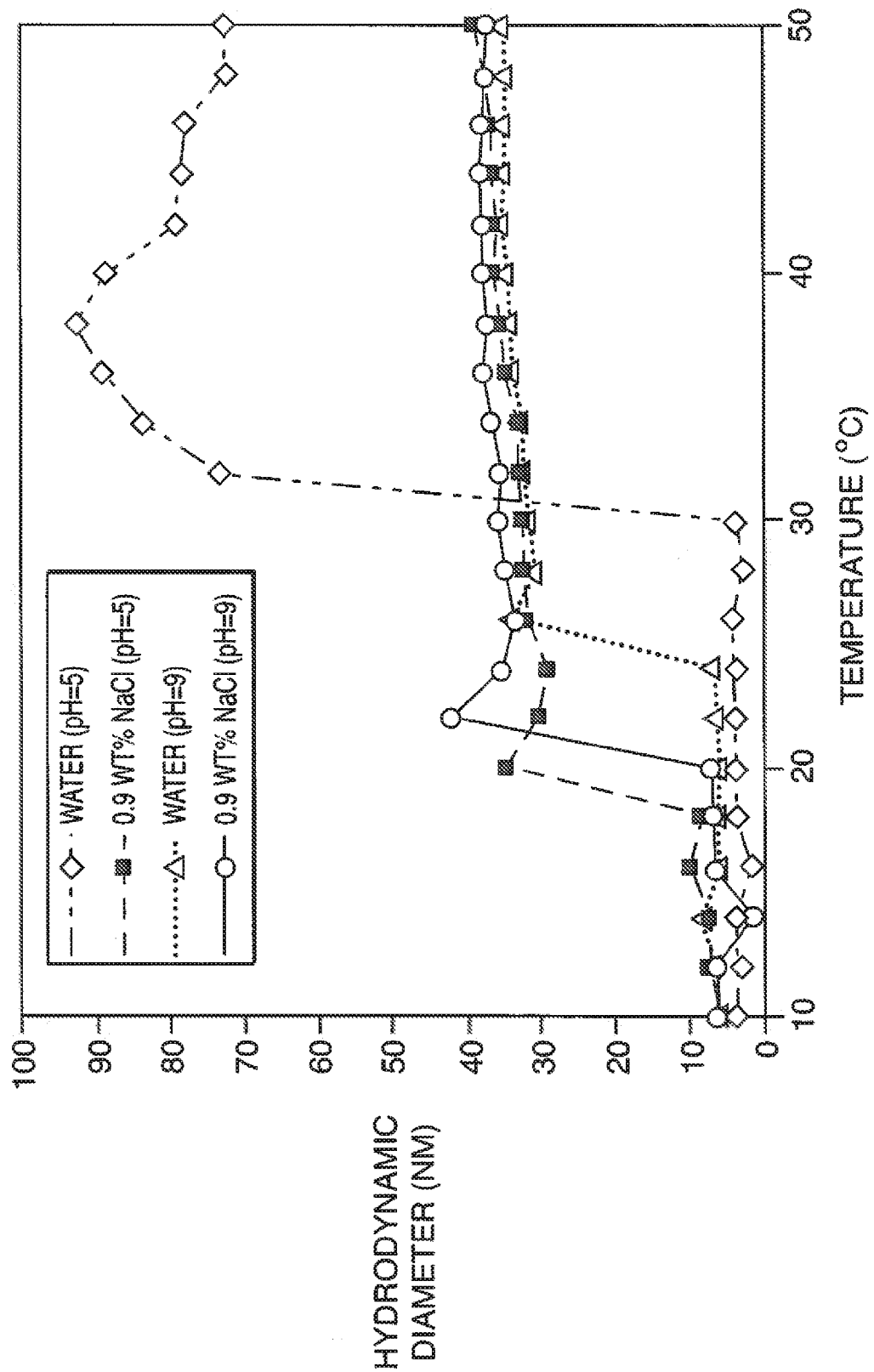
FIG. 4 illustrates the salt-, temperature-, and pH-response of poly(OEG-b-DEG$_{75}$DMA$_5$MMA$_{20}$) 13.5 k-b-19.5 k highlighting triply-responsive block copolymers with respect to salt, pH, and temperature.

Compositions E8 and E9 in Table 3 are A-B diblocks with a water-soluble B of poly(OEG) and a triggerable A block based upon the LCST monomer DEG, the pH sensitive monomer dimethylaminoethyl methacrylate (DMA) which is cationic at lower pH range, and the hydrophobic monomer methyl methacrylate (MMA). These compositions show it is possible to manipulate the CMT through change of not only salt concentration but pH as well. By increasing the amount of the hydrophobic MMA monomer, the CMT values can be changed. The temperature and pH response in deionized water and 0.9 wt % NaCl is shown in FIG. 3 and FIG. 4 for the two compositions E8 and E9, respectively.

TABLE 3

A-B Diblock compositions containing an A block with salt, pH, and temperature triggerable solubility

| Example | A "Triggerable" Block composition DEG (mol %) | A "Triggerable" Block composition DMA (mol %) | A "Triggerable" Block composition MMA (mol %) | B "Soluble" Block composition OEG (mol %) | Block A $M_n$ (kg/mol) | Block B $M_n$ (kg/mol) | CMT (°C.) at pH 5 | CMT (°C.) at pH 5, 0.9 wt % NaCl | CMT (°C.) at pH 9 | CMT (°C.) at pH 9, 0.9 wt % NaCl |
|---|---|---|---|---|---|---|---|---|---|---|
| E8 | 90 | 5 | 5 | 100 | 23.3 | 13.5 | 36 | 32 | 30 | 26 |
| E9 | 75 | 5 | 20 | 100 | 19.5 | 13.5 | 30 | 18 | 24 | 20 |

Example 6

Figure 5:
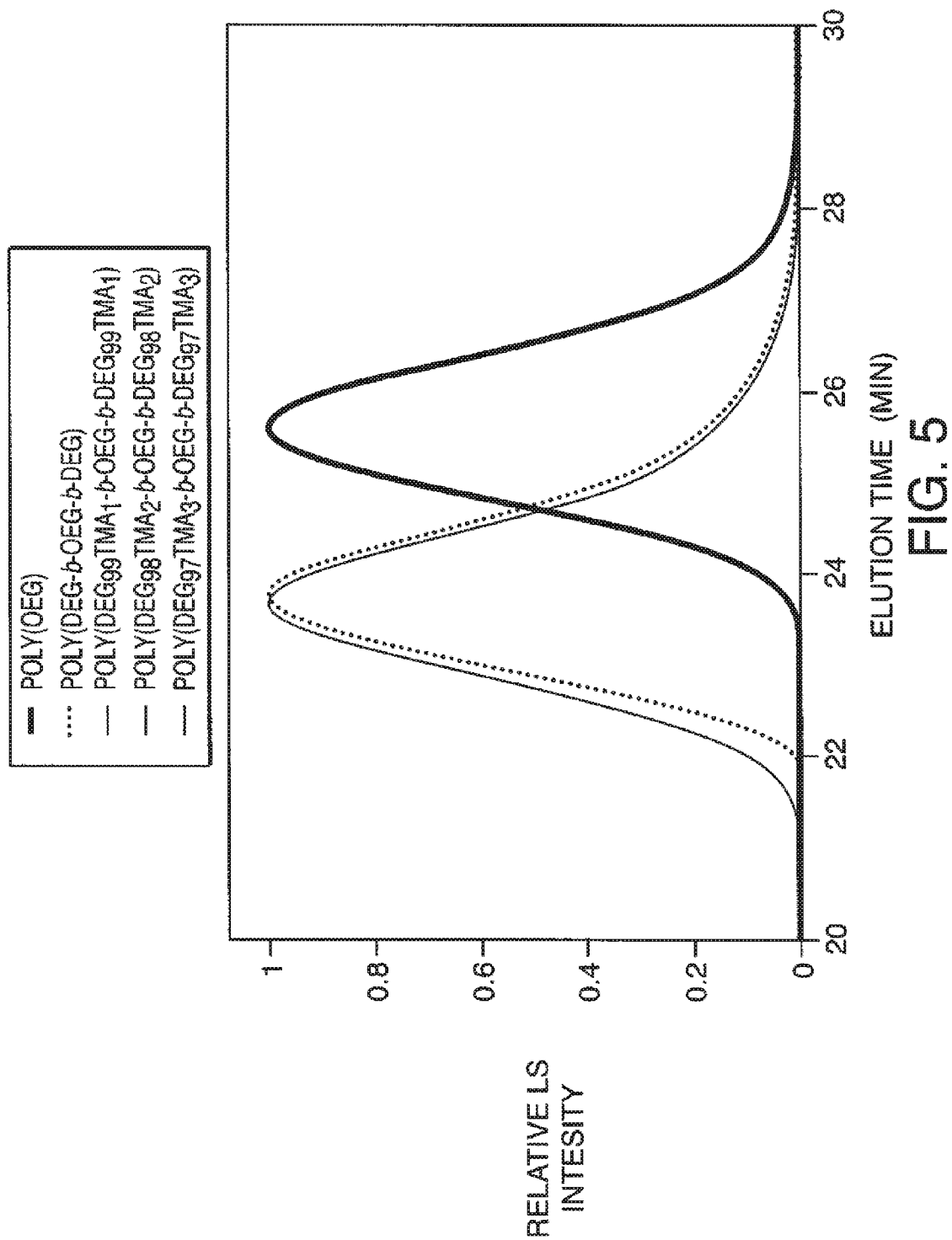
FIG. 5 illustrates an aqueous SEC analysis of the difunctional poly(OEG) macro-CTA and the resulting triblock copolymers poly(DEG$_x$TMA$_y$-b-OEG-b-DEG$_x$TMA$_y$) showing that there is no contamination of the macroCTA in the triblock copolymers.
Figure 6:
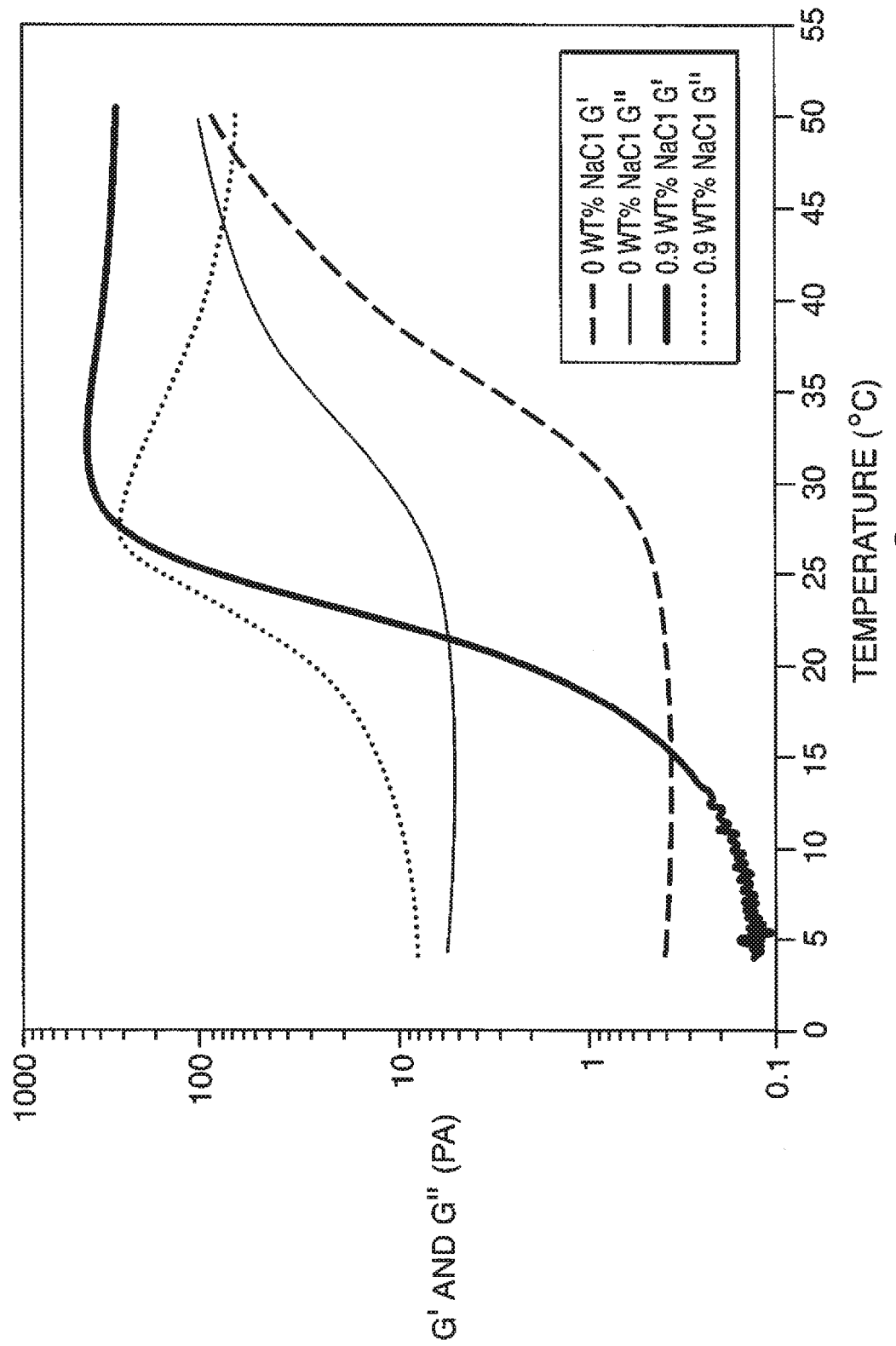
FIG. 6 illustrates the temperature- and salt-responsive nature of poly(DEG$_{97}$TMA$_3$-b-OEG-b-DEG$_{97}$TMA$_3$) using solution rheology with 25 wt % polymer in deionized water or 0.9 wt % NaCl. The temperature where G' and G" overlap is designated as the gel point temperature.
Figure 7:
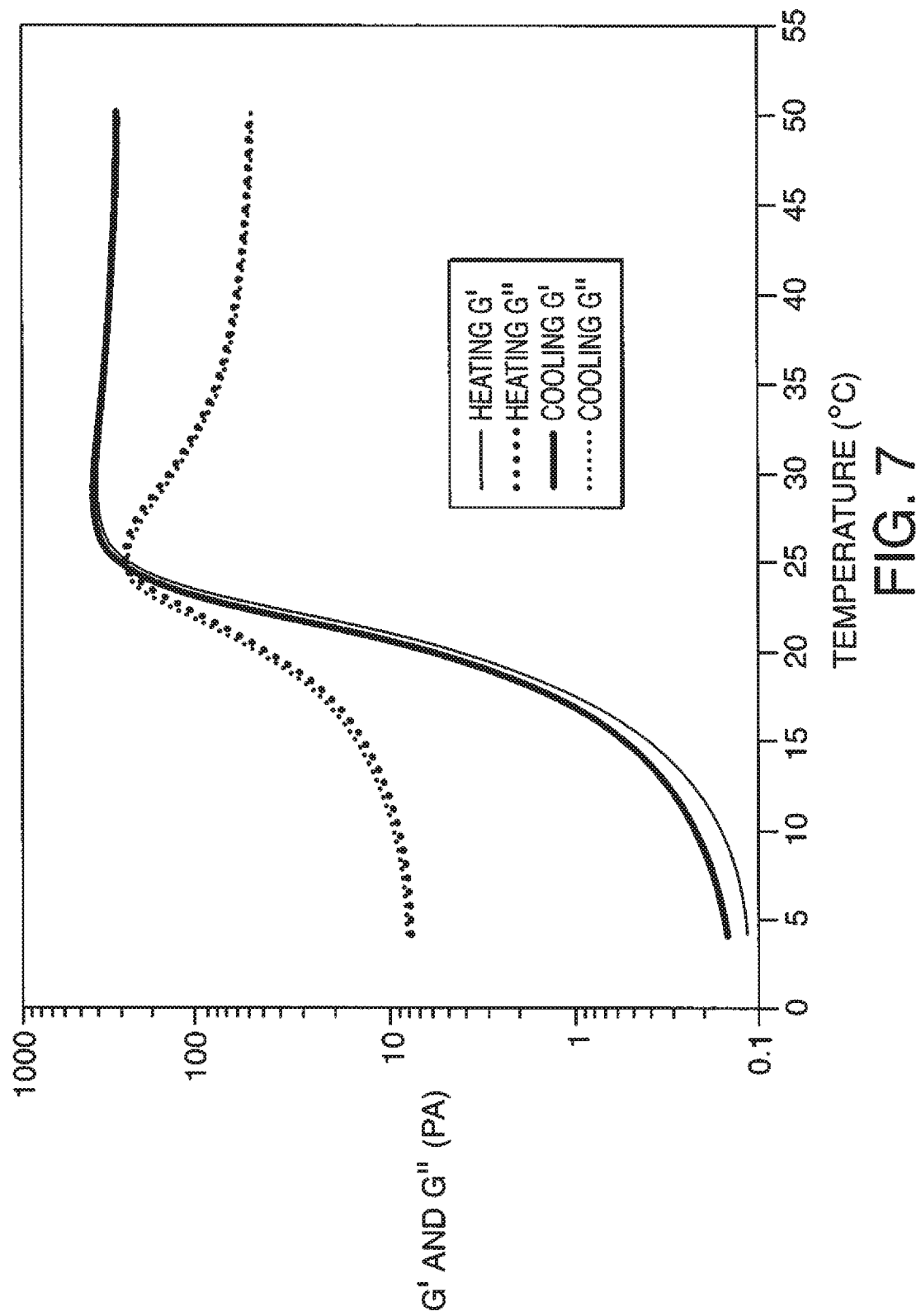
FIG. 7 illustrates a hysteresis analysis of poly (DEG$_{98}$TMA$_2$-b-OEG-b-DEG$_{98}$TMA$_2$) under heating and cooling cycles with 25 wt % polymer in 0.9 wt % NaCl water solution.
Figure 8B:
FIG. 8b illustrates a depiction of hydrogel formation on the Peltier plate geometry at 37° C.
Figure 8A:
FIG. 8a illustrates a representative example of hydrogel formation at 30° C. 25 wt % poly(DEG$_{97}$TMA$_3$-b-OEG-b-DEG$_{97}$TMA$_3$) in 0.9 wt % NaCl solution in the left test tube and 25 wt % poly(DEG$_{97}$TMA$_3$-b-OEG-b-DEG$_{97}$TMA$_3$ in deionized water in the right test tube.

In Table 4 A-B-A triblock compositions are shown. The water soluble B block was created from a difunctional poly (OEG) macro-CTA (composition C12) via RAFT polymerization which was then chain-extended to create the outer triggerable A blocks based upon the LCST monomer DEG and the cationically charged TMA monomer with different comonomer ratios. FIG. 5 shows the SEC illustrating that there is no macro-CTA or diblock copolymer contamination in the triblock copolymer samples. Triblock compositions E13 shows a gel point temperature at 25 wt % in the presence of 0.9 wt % NaCl within the target range and soluble at temperatures well above body temperature in the absence of salt. FIG. 6 illustrates the temperature dependent rheology data for composition E13 with and without the presence of 0.9 wt % NaCl and illustrates the GPT at the overlap of the G' and G" curves. FIG. 7 illustrates that the transition at the GPT for E12 is reversible as the G' and G" values upon heating and cooling are comparable.

TABLE 4

Molecular weight analysis and characterization of the poly(OEG) macroCTA and the resulting triblock copolymers poly($DEG_xTMA_y$-b-OEG-b-$DEG_xTMA_y$). Sol-gel transitions for triblock copolymers with 25 wt % polymer in pure water or 0.9 wt % NaCl solutions

| Example | A Triggerable Block Composition | | B Soluble Block Composition | A Block | B Block | Overall | PDI | Gel Point, No Salt | Gel Point 0.9 wt % Salt |
|---|---|---|---|---|---|---|---|---|---|
| | DEG (mol %) | TMA (mol %) | OEG (mol %) | $M_n$ (kg/mol) | $M_n$ (kg/mol) | $M_n$ (kg/mol) | | (° C.) | (° C.) |
| C15 | n/a | n/a | 100 | n/a | 64.9 | 64.9 | 1.01 | n/a | n/a |
| C16 | 100 | 0 | 100 | 84.6 | 64.9 | 234 | 1.14 | 26 | 22 |
| C17 | 99 | 1 | 100 | 87.1 | 64.9 | 239 | 1.17 | 30 | 23 |
| E12 | 98 | 2 | 100 | 82.1 | 64.9 | 229 | 1.20 | 40 | 26 |
| E13 | 97 | 3 | 100 | 82.6 | 64.9 | 230 | 1.19 | >50 | 28 |

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

All documents cited in the Detailed Description are, in relevant part, incorporated herein by reference; the citation of any document is not to be construed as an admission that it is prior art with respect to the present disclosure. To the extent that any meaning or definition of a term in this written document conflicts with any meaning or definition of the term in a document incorporated by reference, the meaning or definition assigned to the term in this written document shall govern.

While particular aspects of the present disclosure have been illustrated and described, it would be obvious to those skilled in the art that various other changes and modifications can be made without departing from the spirit and scope of the disclosure. It is therefore intended to cover in the appended claims all such changes and modifications that are within the scope of this disclosure.

What is claimed is:

1. A composition comprising a responsive block copolymer, the responsive block copolymer comprising at least one block A that is a triggerable copolymer and at least one block B that is a hydrophilic copolymer including a monomer selected from the group consisting of 2-hydroxypropyl acrylate, hydroxyethyl methacrylate, hydroxyethyl acrylate, and poly(ethylene glycol) methyl ether acrylate, the triggerable copolymer comprising at least one lower critical solution temperature monomer that is an oligoethylene oxide-based (meth)acrylate and at least one charged monomer, wherein the triggerable copolymer block A is a dual trigger block configured to trigger on temperature and ionic strength, and wherein the responsive block copolymer micellizes or gels at a temperature between 28 ° C. and 37 ° C. and a salt concentration of about 0.9 wt %.

2. The composition of claim 1, wherein the responsive block copolymer is a diblock copolymer.

3. The composition of claim 1, wherein the responsive block copolymer is a triblock copolymer.

4. The composition of claim 1, wherein the responsive block copolymer is in the form A-B.

5. The composition of claim 1, wherein the responsive block copolymer is in the form A-B-A.

6. The composition of claim 1, wherein the responsive block copolymer is in the form B-A-B.

7. The composition of claim 1, wherein the responsive block copolymer micellizes or gels at a temperature above 30 ° C. at approximately 0.9 wt % sodium chloride.

8. The composition of claim 1, wherein the responsive block copolymer micellizes or gels at a temperature between 30 ° C. and 35 ° C. and at a salt concentration of about 0.9 wt %.

9. The composition of claim 1, wherein the oligoethylene oxide-based (meth)acrylate is selected from di(ethylene glycol) methyl ether acrylate, di(ethylene glycol) ethyl ether acrylate, di(ethylene glycol) ethyl ether methacrylate, di(ethylene glycol) methyl ether methacrylate, tri(ethylene glycol) methyl ether acrylate, and tri(ethylene glycol) methyl ether methacrylate.

10. The composition of claim 1, wherein the charged monomer is selected from acrylate, methacrylate, or acrylamide monomers with either cationic, zwitterionic, or anionic-functional groups.

11. A composition comprising a responsive block copolymer, the responsive block copolymer comprising a block A that is a triggerable copolymer and a block B that is a hydrophilic copolymer including a monomer selected from the group consisting of 2-hydroxypropyl acrylate, hydroxyethyl methacrylate, hydroxyethyl acrylate, and poly(ethylene glycol) methyl ether acrylate, the triggerable copolymer comprising at least one lower critical solution temperature monomer that is an oligoethylene oxide-based (meth)acrylate and at least one charged monomer, wherein the triggerable copolymer block A is a dual trigger block configured to trigger on temperature and ionic strength, and wherein the A block becomes insoluble at a temperature between 28° C. and 37° C. and a salt concentration of about 0.9 wt %.

12. The composition of claim 11, wherein the responsive block copolymer further comprises a second triggerable block A.

13. The composition of claim 11, wherein the responsive block copolymer is in the form A-B-A.

14. The composition of claim 11, wherein the responsive block copolymer micellizes or gels at a temperature between 30° C. and 35° C. and at a salt concentration of about 0.9 wt %.

15. The composition of claim 11, wherein the responsive block copolymer becomes insoluble at a temperature above 30° C. at approximately 0.9 wt % sodium chloride.

16. A composition comprising a responsive triblock copolymer, the responsive triblock copolymer comprising:

two blocks A that are each a triggerable copolymer, each triggerable copolymer comprising at least one lower critical solution temperature monomer and at least one charged monomer, wherein each triggerable copolymer block A is a dual trigger block configured to trigger on temperature and ionic strength; and a hydrophilic copolymer block B including a monomer selected from the group consisting of 2-hydroxypropyl acrylate, hydroxyethyl methacrylate, hydroxyethyl acrylate, and poly(ethylene glycol) methyl ether acrylate, wherein the responsive block copolymer is in the form A-B-A, and wherein the responsive block copolymer gels at a temperature between 30° C. and 37° C. at approximately 0.9 wt % sodium chloride.

17. The composition of claim 16, wherein the responsive block copolymer gels at a temperature between 30° C. and 35° C. and at a salt concentration of about 0.9 wt %.

* * * * *